United States Patent
Lewis et al.

(10) Patent No.: US 11,418,601 B2
(45) Date of Patent: *Aug. 16, 2022

(54) HANDOFF FEATURE FOR CONTENT SHARING PLATFORMS

(71) Applicant: Google LLC, Mountain View, CA (US)

(72) Inventors: Justin Lewis, Marina Del Rey, CA (US); Ankit Shah, Fremont, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/322,415

(22) Filed: May 17, 2021

(65) Prior Publication Data

US 2021/0289035 A1    Sep. 16, 2021

Related U.S. Application Data

(63) Continuation of application No. 15/715,580, filed on Sep. 26, 2017, now Pat. No. 11,012,519.

(Continued)

(51) Int. Cl.
*G06F 15/16* (2006.01)
*H04L 67/148* (2022.01)
(Continued)

(52) U.S. Cl.
CPC .......... *H04L 67/148* (2013.01); *G06F 9/451* (2018.02); *G06F 16/735* (2019.01);
(Continued)

(58) Field of Classification Search
CPC .............. H04L 67/148; H04L 65/1083; H04L 65/4084; H04L 67/146; H04L 67/22; H04L 67/26; G06F 9/451; G06F 16/735
See application file for complete search history.

(56) References Cited

U.S. PATENT DOCUMENTS

| 8,649,768 B1 * | 2/2014 | Gaddam | H04W 12/06 455/411 |
| 2005/0015601 A1 * | 1/2005 | Tabi | H04L 63/08 713/182 |

(Continued)

FOREIGN PATENT DOCUMENTS

| CN | 1914612 A | 2/2007 |
| CN | 101145926 A | 3/2008 |

(Continued)

OTHER PUBLICATIONS

PCT Notification Of Transmittal Of The International Search Report And The Written Opinion Of The International Searching Authority for PCT Application No. PCT/US2017/053760, dated Nov. 15, 2017, 14 pages.

(Continued)

*Primary Examiner* — Anh Nguyen
(74) *Attorney, Agent, or Firm* — Lowenstein Sandler LLP

(57) ABSTRACT

Implementations disclose a handoff feature for a content sharing platform. A method includes maintaining a session history of a session that occurred at a first client device, the session history identified by a visit identifier (ID) and comprising a set of recently consumed content items on a content sharing platform, determining that a user associated with the session is active on a second client device, transmitting, to the second client device, a session continuation notification associated with the visit ID and a navigation end-point of the session, receiving, from the second client device, a request for a content item corresponding to the navigation end-point of the session, and transmitting, to the second client device, instructions to load the content item and to request additional components of the content item using the visit ID.

20 Claims, 9 Drawing Sheets

Related U.S. Application Data

(60) Provisional application No. 62/439,877, filed on Dec. 28, 2016.

(51) Int. Cl.
    *H04L 67/146* (2022.01)
    *H04L 67/55* (2022.01)
    *G06F 9/451* (2018.01)
    *G06F 16/735* (2019.01)
    *H04L 65/1083* (2022.01)
    *H04L 65/612* (2022.01)
    *H04L 67/50* (2022.01)

(52) U.S. Cl.
    CPC ...... *H04L 65/1083* (2013.01); *H04L 65/4084* (2013.01); *H04L 67/146* (2013.01); *H04L 67/22* (2013.01); *H04L 67/26* (2013.01)

(56) References Cited

U.S. PATENT DOCUMENTS

| | | | |
|---|---|---|---|
| 2014/0068087 A1 | 3/2014 | Spencer | |
| 2014/0358898 A1* | 12/2014 | Lehtiniemi | G06F 16/4387 707/722 |
| 2015/0006631 A1 | 1/2015 | Deshpande et al. | |
| 2015/0356195 A1 | 12/2015 | Kilzer | |
| 2016/0173540 A1* | 6/2016 | Linden | H04L 65/1083 705/26.8 |
| 2016/0182602 A1* | 6/2016 | Cordonnier | H04L 67/025 715/740 |

FOREIGN PATENT DOCUMENTS

| | | |
|---|---|---|
| CN | 101287014 A | 10/2008 |
| CN | 102065340 A | 5/2011 |
| CN | 102123131 A | 7/2011 |
| CN | 104813305 A | 7/2015 |
| WO | 2014056404 A1 | 4/2014 |

OTHER PUBLICATIONS

Chinese Office Action for CN Application No. 201780080743.6 dated Feb. 24, 2021, 19 pages.

Indian Office Action for IN Application No. 201947028584 dated Mar. 30, 2021, 6 pages.

* cited by examiner

HANDOFF FEATURE FOR CONTENT SHARING PLATFORMS

RELATED APPLICATIONS

This application is a continuation of U.S. patent application Ser. No. 15/715,580 filed Sep. 26, 2017, which claims the benefit of a provisional U.S. Patent Application No. 62/439,877 filed on Dec. 28, 2016. The entire contents of the above-referenced applications are incorporated by reference herein.

TECHNICAL FIELD

This disclosure relates to the field of content sharing platforms and, in particular, to a handoff feature for content sharing platforms.

BACKGROUND

Content-sharing platforms and their corresponding websites and mobile applications ("apps") allow users to play and watch music and videos. With increasing availability of different mediums to access services or applications (such as a content sharing platform), requests to these centralized services or applications are originating from a variety of sources. Despite the different access mediums, the underlying reason for using the services remains the same.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes maintaining a session history of a session that occurred at a first client device, the session history identified by a visit identifier (ID) and comprising a set of recently consumed content items on a content sharing platform, determining that a user associated with the session is active on a second client device, transmitting, to the second client device, a session continuation notification associated with the visit ID and a navigation end-point of the session, receiving, from the second client device, a request for a content item corresponding to the navigation end-point of the session, and transmitting, to the second client device, instructions to the content item and to request additional components of the watch page UI using the visit ID, the additional components comprising recommended content items to consume next that are identified based on the set of recently consumed content items associated with the visit ID.

In one implementation, the navigation end-point may include an identifier of a last consumed content item on the first client device and a timestamp comprising a location within the last viewed content item corresponding to a stopping point of the session at the first client device. Furthermore, the visit ID may be different than a session ID, where the visit ID is associated with content sharing platform events associated with the first client device and corresponding to the user, and where occurrences of the content sharing platform events are separated by less than a determined time interval. In addition, the session ID may be associated with the content sharing platform events that occur within a single day on the first client device. In addition, maintaining the session history for each event of the session includes logging a visit ID that is different than the session ID, the visit ID associated with content sharing platform events associated with the first client device and corresponding to the user.

In some implementations, the method further includes receiving an indication of a user selection of a handoff feature from the first client device during the session occurring at the first client device and, responsive to receiving the indication, identifying one or more client devices comprising at least the second client device as associated with the user, generating the session continuation notification responsive to receiving the indication, and transmitting the session continuation notification to the identified one or more client devices. In addition, the one or more client devices may be registered and identified as associated with the user at the content sharing platform.

In one implementation, the method further includes determining that the content sharing platform is being accessed at the second client device, where the access is associated with the user, responsive to the determining, identifying the session of the user on the first client device, identifying the visit ID and the navigation end-point as corresponding to the session, and generating the session continuation notification. Further, the second client device may load the content item with the additional components on the second client device in response to receiving the instructions, wherein the content item and the additional components allows the session to resume on the second client device. Additionally, the set of recommended content items may be a playlist.

Computing devices for performing the operations of the above described method and the various implementations described herein are disclosed. Computer-readable media that store instructions for performing operations associated with the above described method and the various implementations described herein are also disclosed.

BRIEF DESCRIPTION OF THE DRAWINGS

The present disclosure is illustrated by way of example, and not by way of limitation, in the figures of the accompanying drawings.

DETAILED DESCRIPTION

Figure 1:
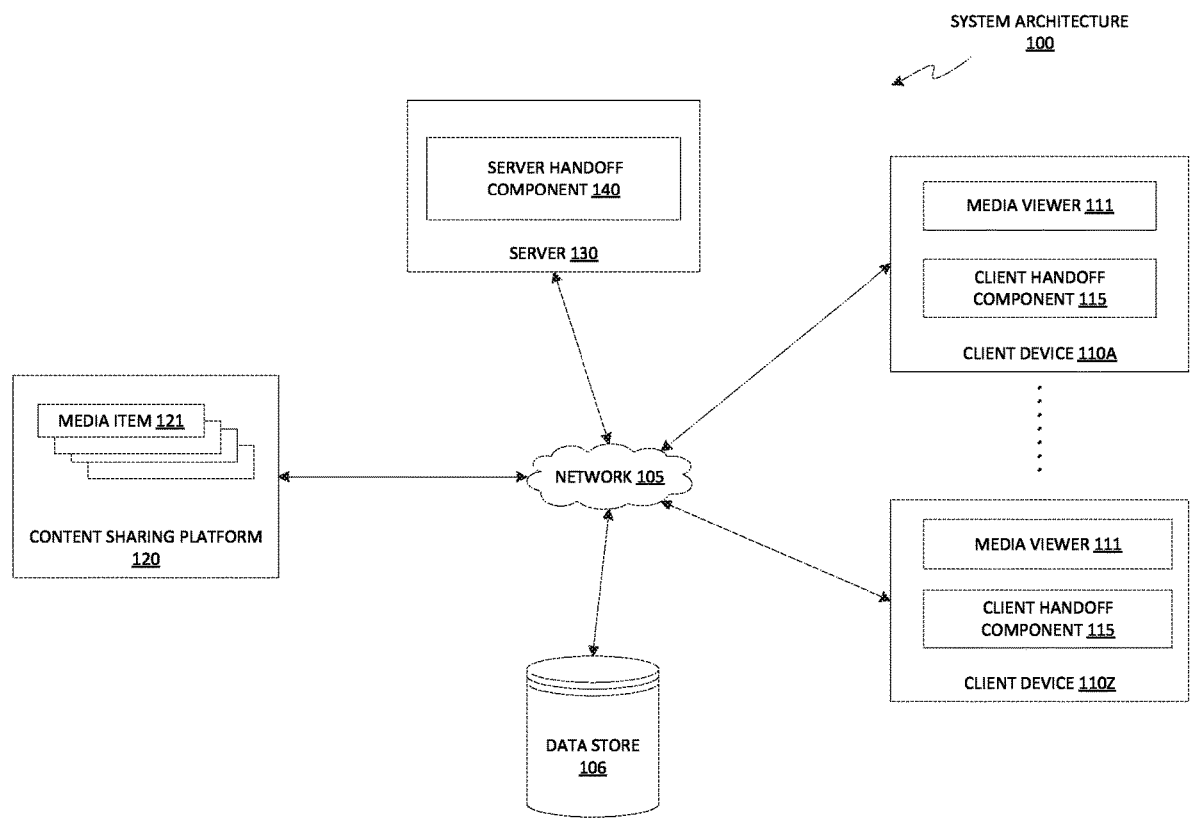
FIG. 1 is a block diagram illustrating an exemplary network architecture in which implementations of the disclosure may be implemented.

Aspects and implementations of the disclosure are directed to a handoff feature for content sharing platforms. In one implementation, multiple computing devices, such as desktop computing devices and mobile devices, including cell phones and tablet devices, can be utilized to access a content sharing platform. Users are increasingly using different mediums to access the same services or applications (such as a content sharing platform). For example, a user can consume (e.g., watch, listen, view, etc.) a series of content items (e.g., videos) of a content sharing platform on a first client device (e.g., via a media viewer provided on a web browser or application of the client device). This may be referred to as a session, a viewing session, a watch session, a visit, and so on, of the user. To provide for convenient and seamless session, a content sharing platform can provide a handoff feature to allow a session of a user to be continued on a second client device used to access the session.

However, conventional systems for handoff of sessions on a content sharing platform do not provide for a handoff feature that accounts for a user's specific sessions and visits. For example, conventional systems do not consider the most recent session history when handing off a session from one device to another device. Implementations of the disclosure provide for a smooth transition in session handoffs by transferring a visit identifier (ID) as part of the session handoff, where the visit ID allows the session to restart at its most-recent endpoint and allows the session to resume with content recommendations that are relevant to the most recent viewing history of the session.

Implementations of the disclosure provide for a handoff feature to transfer the session from a first client device to a second client device. The handoff feature of implementations of the disclosure enables the session of the user to be resumed on the second client device at a same point (referred to herein as a navigation end-point) where the session ended on the first client device. Furthermore, the session continuation provided by the handoff feature in implementations of the disclosure is based on a set of content items that were recently-consumed by the user during the session at the first client device, rather than being based on an entirety of a watch history associated with the user on the content sharing platform.

For example, assume that a user usually watches gaming videos and electronic music videos, and occasionally watches country music videos. Further, assume that as part of a recent session on a content sharing platform application, the user primarily consumed country music videos. When the user ends his or her viewing session on the first client device and then initializes an application of the content sharing platform on a second client device (e.g., user changes devices from a desktop computer to a mobile device when changing locations), the user may be prompted, via the application, to continue watching a playlist of country music videos, instead of populating the playlist with electronic and gaming videos (even though those videos are noted preferences of the user based on an entire watch history of the user on the content sharing platform).

Implementations of the disclosure provide a technical improvement by introducing a handoff feature of a content sharing platform that improves the usability of the content sharing platform. The usability is improved by providing relevant session continuation data, such as an accurate navigation end-point to resume a session and recommended content items for the session (e.g., based on most recently-consumed content items of the session rather than an entire watch history of the user). This, in turn, decreases time and communication resources used to resume a content session (both by a client device and a server device), thus, improving content sharing platform quality, reducing processing time, reducing utilization of processing resources, and improving user experience.

Implementations of the disclosure often reference videos for simplicity and brevity. However, the teaching of the present disclosure are applied to media items generally and can be applied to various types of content or media items, including for example, video, audio, text, images, program instructions, etc.

FIG. 1 illustrates an example system architecture 100, in accordance with one implementation of the disclosure. The system architecture 100 includes client devices 110A through 110Z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, netbook computers, network-connected televisions, etc. In some implementations, client device 110A through 110Z may also be referred to as "user devices." Each client device includes a media viewer 111. In one implementation, the media viewers 111 may be applications that allow users to view content, such as images, videos, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application (e.g., a mobile application or app) that allows users to view digital media items (e.g., digital videos, digital images, electronic books, etc.). According to aspects of the disclosure, the media viewer 111 may be a content sharing platform application for users to record, edit, and/or upload content for sharing on the content sharing platform, and implements a handoff feature for the content sharing platform. In some implementations, the content sharing platform provides a music streaming service, and the media viewer 111 is a music streaming services application that provides music content and implements a handoff feature as part of the music streaming service.

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that are downloaded from the server 130.

Functions described in one implementation as being performed by the content sharing platform 120 can also be performed on the client devices 110A through 110Z in other implementations, if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), dislike, and/or comment on media items. The content sharing platform 120 may also include a website (e.g., a webpage) or application back-end software that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

The content sharing platform 120 may host data content, such as media items 121. The data content can be digital content chosen by a user, digital content made available by a user, digital content uploaded by a user, digital content chosen by a content provider, digital content chosen by a broadcaster, etc. Examples of a media item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as a content item.

A media item 121 may be consumed via the Internet and/or via a mobile device application. For brevity and simplicity, an online video (also hereinafter referred to as a video) is used as an example of a media item 121 throughout this document. As used herein, "media," "media item," "online media item," "digital media," "digital media item," "content," and "content item" can include an electronic file that can be executed or loaded using software, firmware or hardware configured to present the digital media item to an entity. In one implementation, the content sharing platform 120 may store the media items 121 using the data store 106.

In one implementation, the server 130 may be one or more computing devices (e.g., a rackmount server, a server computer, etc.). In one implementation, the server 130 may be included in the content sharing platform 120. The server 130 may include a server handoff component 140 to implement a handoff feature for the content sharing platform 120. In some implementations, client device 110A-110Z may include a client handoff component 115 that works in conjunction with (or in some implementations, works independently of) server handoff component 140 to provide the handoff feature for the content sharing platform 120. Client handoff component 115 may perform implementations of the disclosure independently of server handoff component 140 of server 130, or may work in conjunction with server handoff component 140. Although the following description may refer to server handoff component 140 performing implementations of the disclosure, it should be understood that the functionality of server handoff component 140 may be similarly performed solely by, and/or in conjunction with, client handoff component 115 at client device 110A-110Z.

In one implementation, a user can consume (e.g., watch, listen, view, etc.) a series of content items (e.g., videos) on a first client device 110A-110Z (e.g., via media viewer 111 provided on a web browser or application of the client device 110A-110Z). This may be referred to as a session, a viewing session, a watch session, a visit, etc. of the user. When the session is ended on the first client device, the server handoff component 140 and/or the client handoff component 114 enable a handoff feature for the content sharing platform so that the session can be resumed on another client device 110A-110Z (i.e., a second client device). The handoff feature provided by server handoff component 140 and/or client handoff component 115 enables the session of the user to be resumed on the second client device 110A-110A at a same point (referred to herein as a navigation end-point) where the session ended on the first client device. Furthermore, the session continuation provided by the handoff feature in implementations of the disclosure is based on a set of content items that were recently-consumed by the user during the session at the first client device, rather than being based on an entirety of a watch history associated with the user on the content sharing platform.

For example, assume that a user usually watches gaming videos and electronic music videos, and occasionally watches country music videos. Further, assume that as part of a recent session on a content sharing platform application, the user primarily consumed country music videos. When the user ends his or her viewing session on the first client device and then initializes an application of the content sharing platform on a second client device (e.g., user changes devices from a desktop computer to a mobile device when changing locations), the user may be prompted, via the application, to continue watching a playlist of country music videos, instead of populating the playlist with electronic and gaming videos (even though those videos are noted preferences of the user based on an entire watch history of the user on the content sharing platform). In addition, the handoff feature of implementations of the disclosure prevents from including in the playlist videos that the user has recently watched during the session at the first client device as recommended content. This prevents the user from being presented with repetitive content items when the user changes client devices.

In some implementations, server handoff component 140 of server 130 may interact with content sharing platform 120 to provide implementations of the disclosure. Further description of the server handoff component 140 and the client handoff component 115, as well as their specific functions, are described in more detail below with respect to FIG. 2.

Although implementations of the disclosure are discussed in terms of content sharing platforms and providing a handoff feature for the content sharing platform, implementations may also be generally applied to any type of social network providing connections between users. Implementations of the disclosure are not limited to content sharing platforms that provide channel subscriptions to users.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 2:
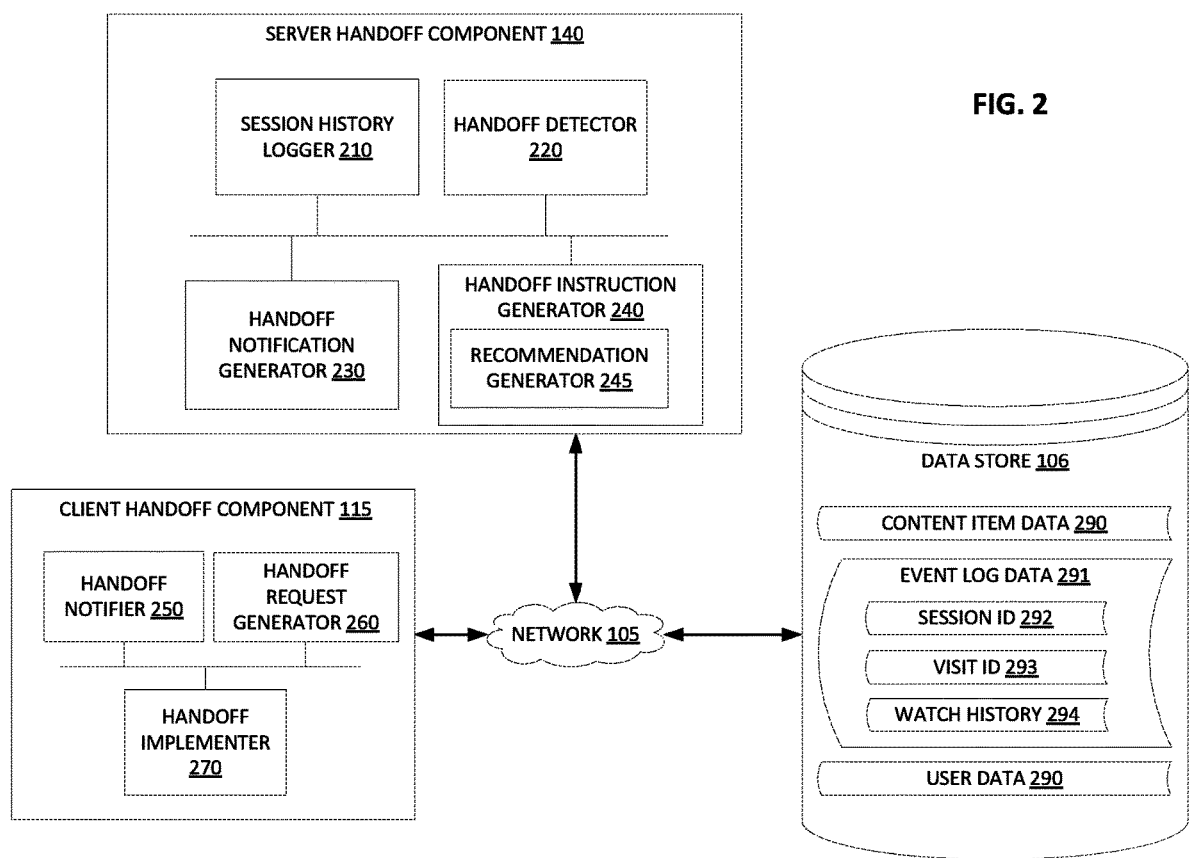
FIG. 2 is a block diagram of server handoff component and client handoff component, in accordance with an implementation of the disclosure.

FIG. 2 is a block diagram illustrating server handoff component 140 and client handoff component 115 in accordance with one implementation of the disclosure. As discussed above, the server handoff component 140 may interact with a single social network, or may be utilized among multiple social networks (e.g., provided as a service of a content sharing platform that is utilized by other third party social networks). In one implementation, the server handoff component 140 includes a session history logger 210, a handoff detector 220, a handoff notification generator 230, and a handoff instruction generator 240. More or less components may be included in the server handoff component 140 without loss of generality. For example, two of the modules may be combined into a single module, or one of the modules may be divided into two or more modules. In one implementation, one or more of the modules may reside on different computing devices (e.g., different server computers, on a single client device, or distributed among multiple client devices, etc.). Furthermore, one or more of the modules may reside on different content sharing platforms, third party social networks, and/or external servers.

The server handoff component 140 is communicatively coupled to the client handoff component 115 and the data store 106. For example, the server handoff component 140 may be coupled to client handoff component 115 and the data store 106 via a network (e.g., via network 105 as illustrated in FIG. 1).

In one implementation, the client handoff component 115 includes a handoff notifier 250, a handoff request generator 260, and a handoff implementer 270. More or less components may be included in the client handoff component 115 without loss of generality. For example, two of the modules may be combined into a single module, or one of the modules may be divided into two or more modules. In one implementation, one or more of the modules may reside on different computing devices (e.g., different server computers, on a single client device, or distributed among multiple client devices, etc.). Furthermore, one or more of the modules may reside on different content sharing platforms, third party social networks, and/or external servers.

The data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). The data store 106 includes content item data 290, event log data 291 (which may further include session identifiers (IDs) 292, visit IDs 293, and watch history 294), and user data 295.

As discussed above, the server handoff component 140 and the client handoff component 115, individually and/or in combination, enable handoff (i.e., transfer) of a session for a procedurally-generated list of content items from one client device to another client device. As part of a session on a content sharing platform, a user may consume (e.g., watch, listen, view, etc.) a series of content items (e.g., videos, etc. from content item data 290 of data store 106) of the content sharing platform on a first client device. When the session is ended on the first client device, the server handoff component 140 and/or the client handoff component 114 enable a handoff feature for the content sharing platform so that the session can be resumed/continued on a second client device at a navigation end-point where the session ended on the first client device. Each of the first and second client devices of the user may include a client handoff component 115 to enable the handoff feature in implementations of the disclosure. Furthermore, the session continuation provided by the handoff feature in implementations of the disclosure is based on a set of content items that were recently-consumed by the user during the session at the first client device, rather than being based on an entirety of a watch history associated with the user on the content sharing platform.

When the session is occurring on a first client device, a session history logger 210 of the server handoff component 140 logs the actions of the user during the session, including a sequence of content items that the user consumed during the session. The session history logger 210 logs each event (e.g., watch history 294 representing views of content items by the user, etc.) in event log data 291 of data store 106. Each event (e.g., watch history 294) is logged in event log data 291 with a session ID 292 that represents the user and is also logged with a separate visit ID 293.

A session ID 292 may be associated with any interaction by the user with the content sharing platform via a single client device in a single day. Interactions on a different day from the same client device are associated with a new session ID 292 as compared to the session ID 292 associated with the user's interactions on the previous day from the same client device. In addition, user interactions on a different client device on the same day are associated with a different session ID 292.

A visit ID 293 encompasses the user's interactions with the content sharing platform on a single client device that occur within determined time intervals of one another (e.g., each of the interactions of a visit ID 293 are not separated by inactivity of more than a determined time interval). If the determined time interval is exceeded between interactions, then a new visit ID is assigned to the user's next interaction with the content sharing platform on the same client device on the same day. As such, a session ID 292 may encompass multiple visit IDs 293 if a user interacts with the content sharing platform at a client device in discrete intervals of time (i.e., interactions of each visit ID are separated by more than a threshold amount of inactivity time) during a single day. Each event recorded for a user on the same device is associated with the same visit ID 293 if the events occurring with a determined interval and are not separate by a threshold amount of time. Visit IDs 293 are refreshed (i.e., new visit ID 293 generated) when the user closes the application or stops interacting with the content sharing platform for a determined period of time.

When the session on the first client device ends (e.g., content sharing application is closed, inactivity on the content sharing platform for a determined period of time, etc.), the session can be transported (e.g., continued, resumed, handed off, etc.) from the first client device to a second client device of the user. In one implementation, a handoff detector 220 of the server handoff component 140 can identify when a session has ended on one client device (e.g., the first client device) and/or the user associated with the session has become active on another client device (e.g., the second client device). The handoff detector 220 may utilize event log data 291 to identify the end of a session on a first client device and/or the resumption of activity by a user on a second client device.

Implementations of the disclosure provide two variations for how the session can be transported from one client device to another. In a first variation, the handoff notification generator 230 automatically creates and transmits a session continuation notification to the second client device when the handoff detector 220 determines that the second client device is accessing the content sharing platform on behalf of the user. For example, the handoff detector 220 may determine that a user identifier (ID) associated with the user is received as part of an event (e.g., logging into the application of the content sharing platform, requesting a content feed, etc.) corresponding to the second client device. In one implementation, the handoff detector 220 determines that a content associated with the content sharing platform (e.g., a home page, a feed, etc.) is being requested from the second client device (e.g., when a content sharing platform application is initialized via the user on the second client device). The handoff detector 220 inspects the event log data 291 to identify whether there are previous visits to the content sharing platform associated with the user, where the previous visits include consumption of multiple content items and occurred within a determined time period (e.g., within the past 2-3 hours).

In response to the handoff detector 220 identifying a most recent visit that satisfies the above criteria, the handoff notification generator 230 creates and transmits a session continuation notification to the second client device. The session continuation notification may be displayed via the content sharing platform application to the user. In one implementation, the handoff notifier 250 of client handoff component 115 receives and causes display of the session continuation notification from the handoff notification generator 230. In some implementations, the session continuation notification may be displayed as a system notification on the second client device. The session continuation notification may include a prompt that queries the user whether they would like to resume and/or continue the previous session identified by the handoff detector 220.

Figure 3A:
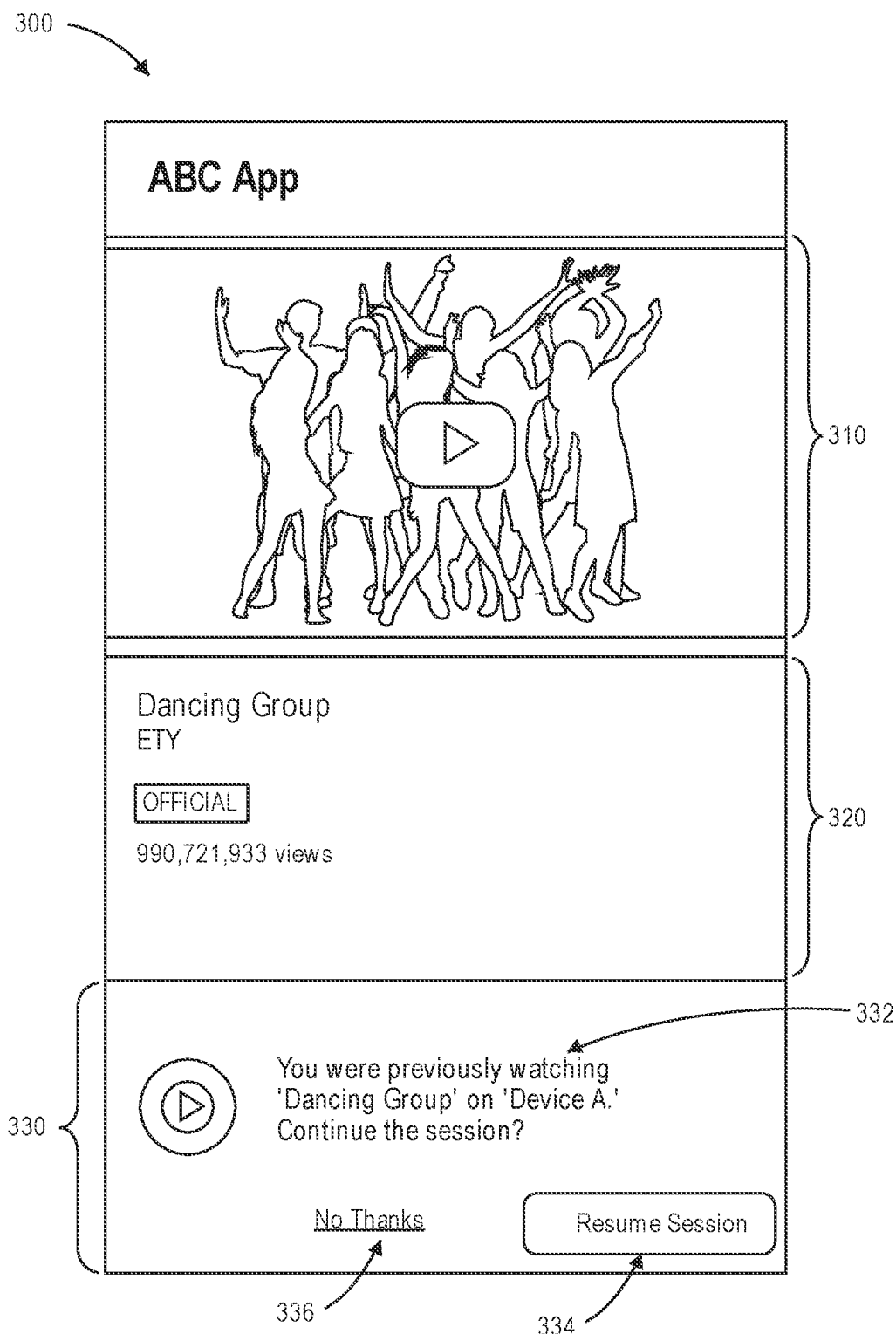
FIGS. 3A and 3B are exemplary screenshots of a UI for a handoff feature for a content sharing platform, according to implementations of the disclosure.

FIG. 3A depicts an example screenshot of a session notification UI 300 including an automatically-generated handoff notification according to implementations of the disclosure. UI 300 may be displayed to notify a user that a session previously held on another client device can be continued or resumed on the current client device of the user. In some implementations, the UI 300 may include a playback portion 310 to provide for playback of a content item (e.g., obtained from content item data 290 of data store 106). UI 300 may also include a content item description portion 320 including identifying information (e.g., obtained from content item data 290) that corresponds to a content item being provided for playback in the playback portion 310. UI 300 may further include a session continuation notification portion 330.

In some implementations, the session continuation notification portion 330 may include text 332 notifying a user that the content item identified in portions 310, 320 was previously being viewed on another client device ("Device A"). The text also prompts the user on whether to continue the session associated with the previously-viewed content item identified in portions 310, 320. The session continuation notification portion 330 includes a button 334 that, when selected, allows the session (associated with the previously-viewed content item identified in portions 310, 320) to be resumed (e.g., continued, handed off, etc.) on the client device that is presenting the UI 300. The session continuation notification portion 330 also includes a link 336 (e.g., HyperText Transport Protocol (HTTP) link, hyperlink, etc.) that allows the user to decline the session continuation notification 330 and continue with a new session on the current client device presenting the UI 300.

Referring back to FIG. 2, in a second variation, the session continuation notification can be generated by handoff notification generator 230 when an indication is received of selection of a handoff feature by the user (e.g., user clicks a button or selects a link associated with the handoff feature) on the first client device. When the handoff feature is selected by the user (e.g., via a link or button representing the handoff feature provided in the user interface (UI) of the content sharing application), a remote procedure call (RPC) is generated by the handoff notifier 250 and transmitted to the handoff detector 220. The handoff detector 220 then triggers the handoff notification generator 230 to send a session continuation notification to one or more other client devices associated with the user. In one implementation, the handoff notification generator 230 is responsible for syndicating the session continuation notification to client devices of the user that are registered to receive notifications from the content sharing platform. The client devices of the user that are registered with the content sharing platform may be identified from user data 295 of data store 106.

Figure 3B:
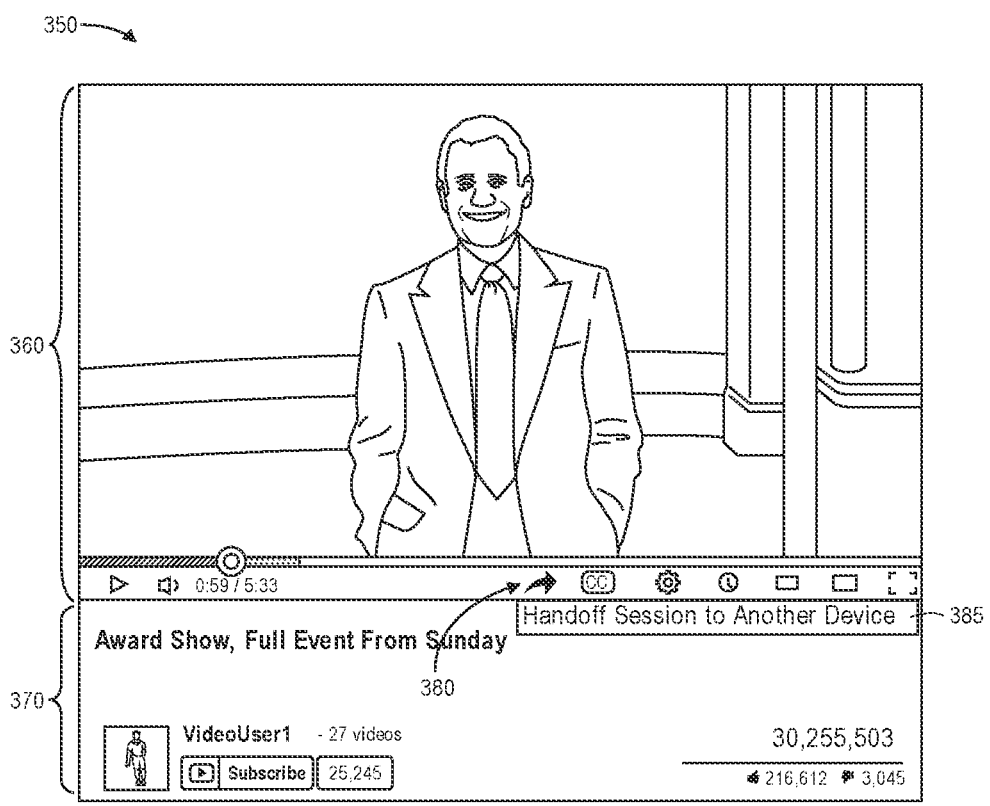

FIG. 3B depicts an example screenshot of a UI 350 enabling manual handoff of a session of a user on a content sharing platform according to implementations of the disclosure. The UI 350 may include a media player 360 playing back a content item and a content item information section 370. Content item information section 370 may detail identifying information of a currently-accessed content item shown in media player 360. The content item information section 370 may include, but is not limited to, information such as a title of the content item, content owner of the content item, posting date of the content item, duration of the content item, number of views of the content item, number of "likes" (e.g., thumbs up) of the content item, number of "dislikes" (e.g., thumbs down) of the content item, and so on.

In one implementation, the UI 350 includes a handoff icon 380. The handoff icon 380 may be part of the media player 360. As shown in FIG. 3B, the handoff icon 380 is part of a controls area of the media player 360 located at a bottom portion of the media player 360. In one implementation, when a viewing user hovers over or selects the handoff icon 530, a drop-down menu 385 may be shown to the viewing user. The drop-down menu 385 may provide further information to the viewing user regarding the handoff feature. For example, drop-down menu 385 may be selected by the viewing user to cause handoff of the current viewing session to another client device. In some implementations, the drop-down menu 385 may detail the other potential client device that the viewing session may be handed off to. When the handoff icon 380 or drop-down menu 385 associated with the handoff icon 380, is selected, a push notification to resume the current viewing session (associated with the content item identified in portions 360, 370) may be generated and transmitted to another client device associated with the user. Other locations and configurations of the handoff icon 380, including types of drop-down menus 385 and other notifications, other than those described with respect to UI 350 may also be utilized in implementations of the disclosure.

Referring back to FIG. 2, in both of the first and second variations described above, the session continuation notification includes a payload. The payload includes a visit ID 293 associated with the identified session and a navigation end-point. In one implementation, the navigation end-point is a time-stamp identifying a location within a content item that was being viewed when the session ended on the first client device. The payload data may be obtained by handoff notification generator 230 from event log data 291.

As discussed above, the handoff notifier 250 of client handoff component 115 at the second client device receives and causes display of the session continuation notification. The session continuation notification may be displayed as a notification within a UI of a content sharing platform application or browser application at the second client device and/or may be system notification generated on the second client device. The session continuation notification may include a prompt that queries the user whether they would like to resume and/or continue the previous identified session identified by the handoff detector 220.

The user may elect to continue the session via the session continuation notification provided at the second client device, for example, by selecting a link or clicking a button of the session continuation notification. Responsive to receiving an indication to proceed with the session (i.e., session handoff), the handoff request generator 260 of client handoff component 115 on the second client device may extract the visit ID and navigation end-point from the session continuation notification payload and generate a client request for a new watch page that corresponds to the received navigation end-point. The generated client request may also include the extracted visit ID. The handoff request generator 260 transmits this client request to the server handoff component 140.

Once the client request is received at server handoff component 140, the handoff instruction generator 240 may generate handoff instructions for the session continuation. The handoff instructions may include instructions to (1) load a watch page that corresponds to the navigation end-point and to (2) request additional component for the watch page. With respect to loading the watch page, the instructions may identify a content item to be loaded as part of the watch page, where the content item corresponds to the navigation end-point of the session. In one implementation, the content item may be the content item that was last consumed by the user (e.g., when the user was in the middle of viewing the content item). In some implementations, the content item may be a next content item of the session (e.g., when the user was at the end of the content item last consumed in the session, or was in between viewing content items in the session).

With respect to requesting the additional component, these additional components may include a recommended set of content items to watch next. In one implementation, the recommended set of content items may be in the form of a playlist. The recommended set of content items may be identified by the recommendation generator 245 of handoff instruction generator 240. Recommendation generator 245 may identify the set of recommended content items based on a set of recently-consumed content items associated with the visit ID. The set of recently-consumed content items associated with the visit ID may be obtained from event log data 291 (i.e., from watch history 294) and may refer to those content items most-recently consumed by the user in the session that is to be continued on the second client device. These recently-consumed content items may be used by recommendation generator 245 to seed the generation of the set of recommended content items.

A description of how a set of recommended content items (e.g., a playlist) may be generated is as follows. First, the recommendation generator 245 takes the collection of seed content items (e.g., content items associated with the visit ID 293) and identifies a set of other user sessions that have consumed any of the seed content items as well as any playlists that contain any of the content items. Next, the identified other user sessions and playlists are weighted by the number of seed content items that each contains. Then, an initial set of content items is generated, where the content items in the initial sets were also watched by users or also included in the playlists that are not the seed content items. Finally, the content items in the initial set are scored and ranked based on the weights for the other user sessions/playlists and the number of other user sessions/playlists that the content item is included in. This produces a collection of content items that are tightly matched to the seed content items and can be used as the recommended set of content items from the recommendation generator 245.

Once the handoff instructions are received by client handoff component 115 at the second client device from the server handoff component 140, the handoff implementer 270 may execute the handoff instructions to resume and/or continue the session on the second client device. The handoff instructions, when executed, cause the handoff implementer 270 to load the watch page including the set of recommended content items to watch next, in a UI of an application (e.g., browser application or content sharing platform application) of the second client device.

In one implementation of the disclosure, after a session has been handed off to a second client device per the above description, a user event may be recorded in event log data 291. The user event records a pairing of the original visit ID of the first client device and the new visit ID used for the second client device. This pairing can be used to daisy chain sessions together so that if a user goes from client device A to client device B to client device C, a continuation playlist (i.e., recommended set of content items) on client device C is seeded with the content items that were consumed on both client devices A and B.

Figure 4:
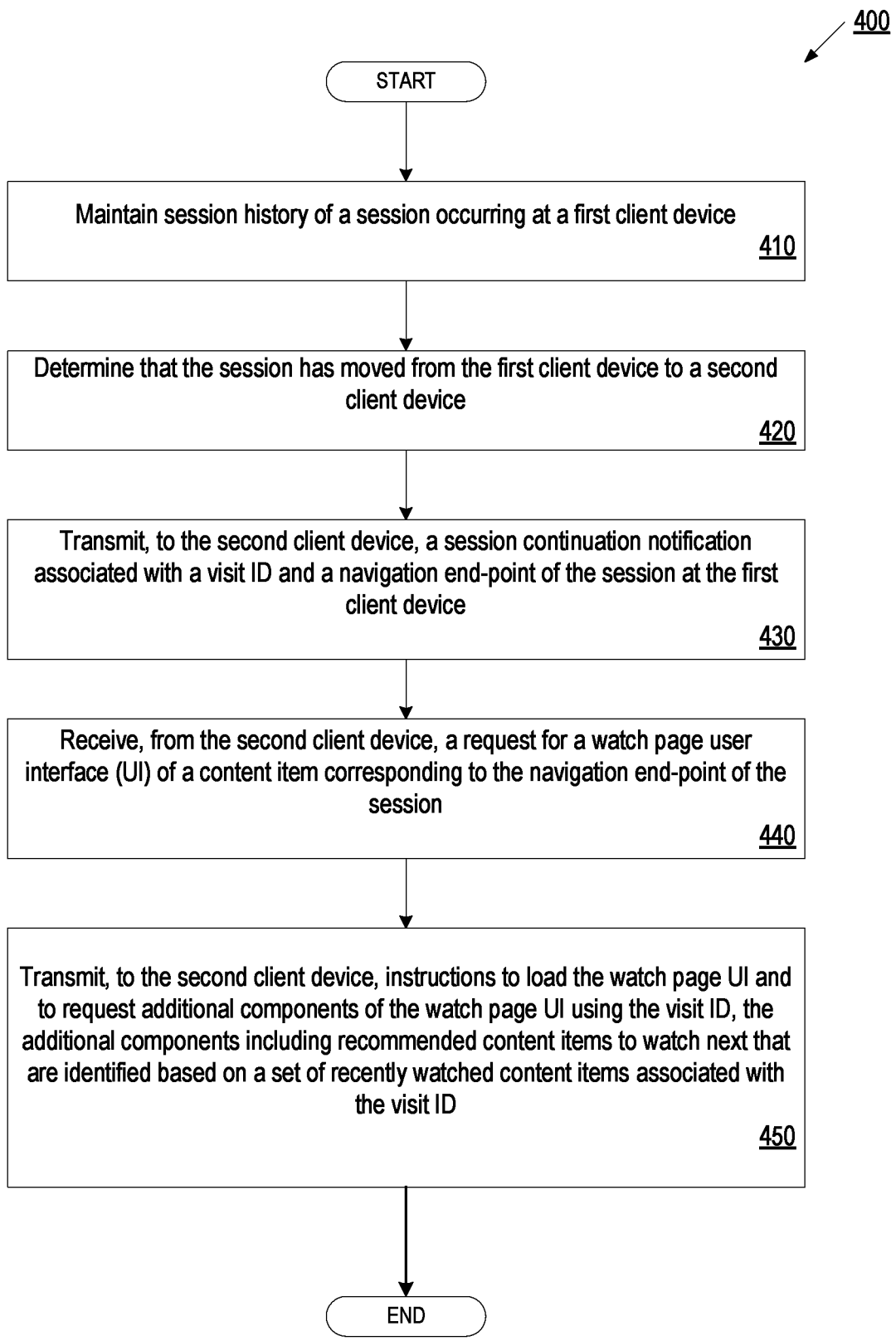
FIG. 4 is a flow diagram illustrating a method for implementing a handoff feature for a content sharing platform at a server device, according to an implementation.

FIG. 4 is a flow diagram illustrating a method 400 for implementing a handoff feature for a content sharing platform at a server device, according to an implementation of the present disclosure. The method 400 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art should understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by server handoff component 140 as shown in FIGS. 1 and 2.

Method 400 begins at block 410 where a session history of a session of a user is maintained, where the session history occurs at a first client device. At block 420, it is determined that the session has moved from the first client device to a second client device. Subsequently, at block 430, a session continuation notification is transmitted to the second client device, where the session continuation notification is associated with a visit ID and a navigation end-point of the session at the first client device.

At block 440, a request is received from the second client device, where the request is for a watch page UI of a content item corresponding to the navigation end-point of the session. Lastly, at block 450, instructions are transmitted to the second client device, where the instructions are to load the watch page UI and to request additional component of the watch page UI using the visit ID. In one implementation, the additional components include recommended content items to watch next that are identified based on a set of recently-watched content items associated with the visit ID.

Figure 5:
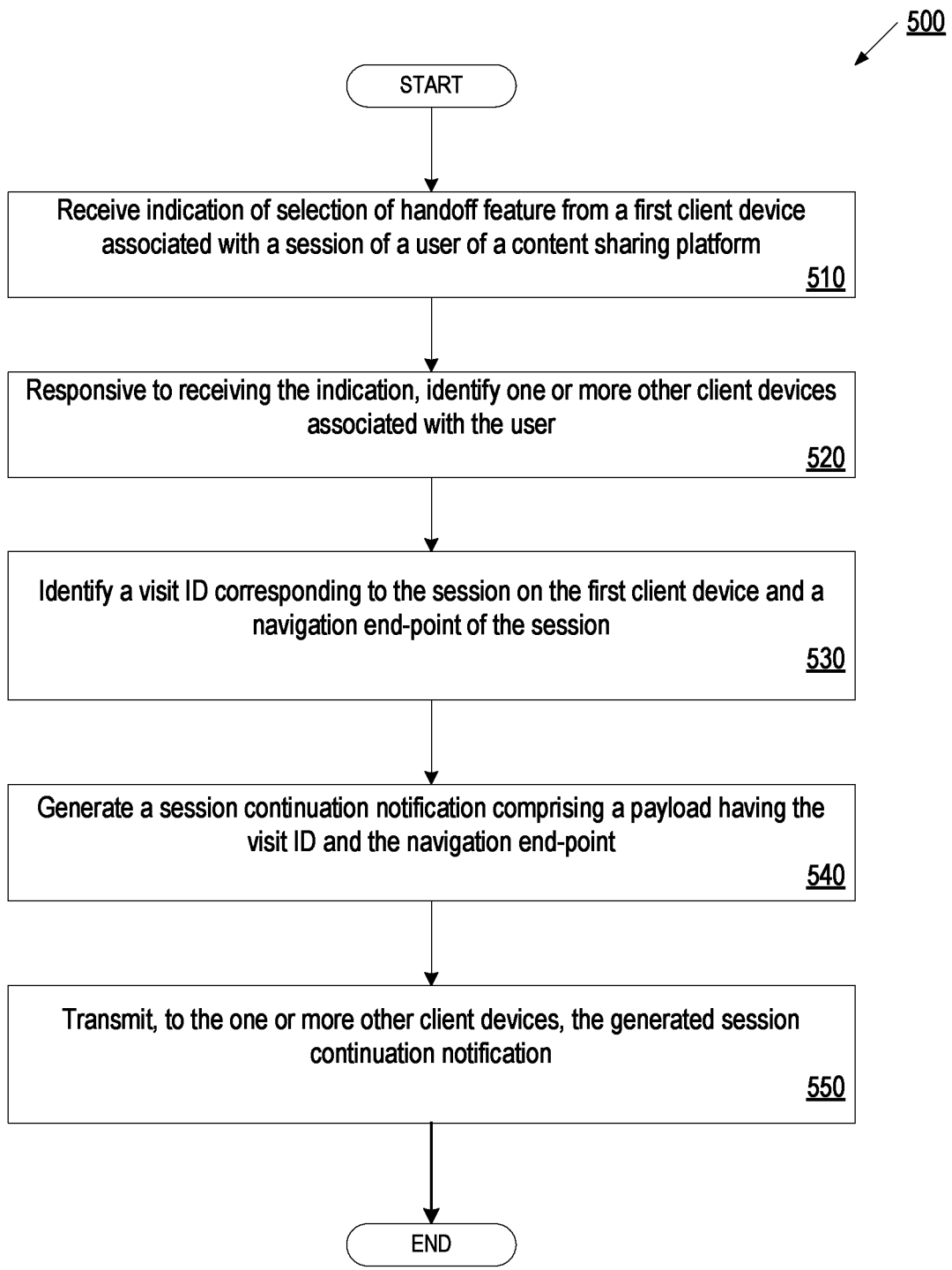
FIG. 5 is a flow diagram illustrating a method for generating a manually-triggered session continuation notification for a handoff feature of a content sharing platform, according to an implementation.

FIG. 5 is a flow diagram illustrating a method 500 for generating a manually-triggered session continuation notification for a handoff feature of a content sharing platform, according to some implementations of the disclosure. The method 500 may be performed by processing logic that comprises hardware (e.g., circuitry, dedicated logic, programmable logic, microcode, etc.), software (e.g., instructions run on a processing device to perform hardware simulation), or a combination thereof. In one implementation, method 500 may be performed by server handoff component 140 as shown in FIGS. 1 and 2.

Method 500 begins at block 510 where an indication of selection of a handoff feature is received from a first client device, where the first client device is associated with a session of a user of a content sharing platform. In one implementation, the selection is a user selection of a button, icon, or link representing a handoff feature at the first client device. At block 520, one or more other client devices are identified as associated with the user responsive to receiving the indication at block 510. Then, at block 530, a visit ID corresponding to the session on the first client device and a navigation end-point of the session are identified.

Subsequently, at block 540, a session continuation notification is generated that includes a payload having the visit ID and the navigation end-point. Lastly, at block 550, the generated session continuation notification is transmitted to the one or more other client devices.

Figure 6:
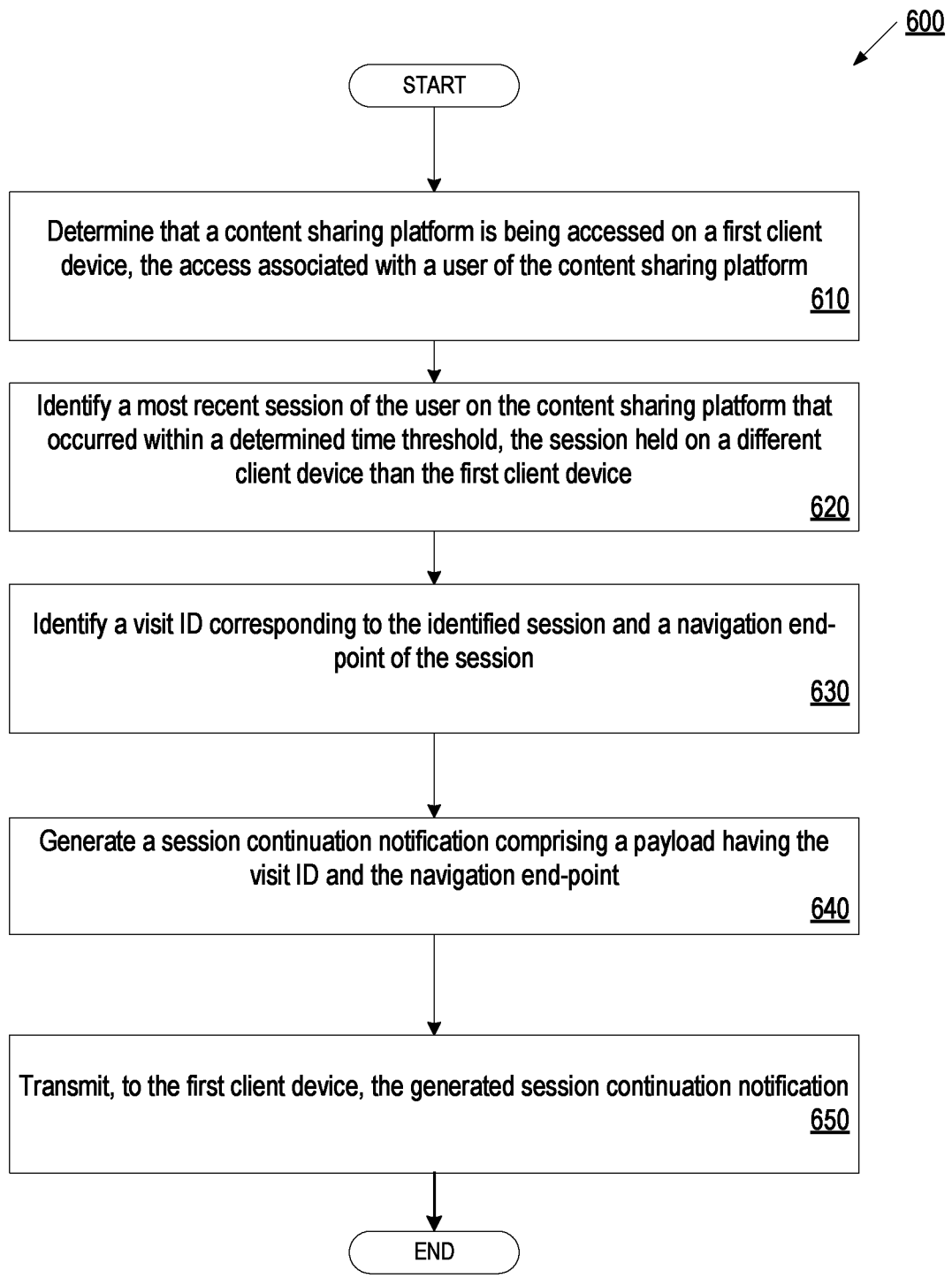
FIG. 6 is a flow diagram illustrating a method for providing an automatically-generated session continuation notification for a handoff feature of a content sharing platform, according to an implementation.

FIG. 6 is a flow diagram illustrating a method 600 for providing an automatically-generated session continuation notification for a handoff feature of a content sharing platform, according to some implementations of the disclosure. The method 600 may be performed by processing logic that comprises hardware (e.g., circuitry, dedicated logic, programmable logic, microcode, etc.), software (e.g., instructions run on a processing device to perform hardware simulation), or a combination thereof. In one implementation, method 600 may be performed by server handoff component 140 as shown in FIGS. 1 and 2.

Method 600 begins at block 610 where a determination is made that a content sharing platform is being accessed on a first client device, the access associated with a user of the content sharing platform. At block 620, a most recent session of the user on the content sharing platform is identified. In one implementation, the most recent session occurred within a determined time threshold and was held on a different client device that the first client device.

Subsequently, at block 630, a visit ID corresponding to the identified session and a navigation end-point of the session are identified. Then, at block 640, a session continuation notification is generated, where the session continuation notification includes a payload having the visit ID and the navigation end-point. Lastly, at block 650, the generated session continuation notification is transmitted to the first client device.

Figure 7:
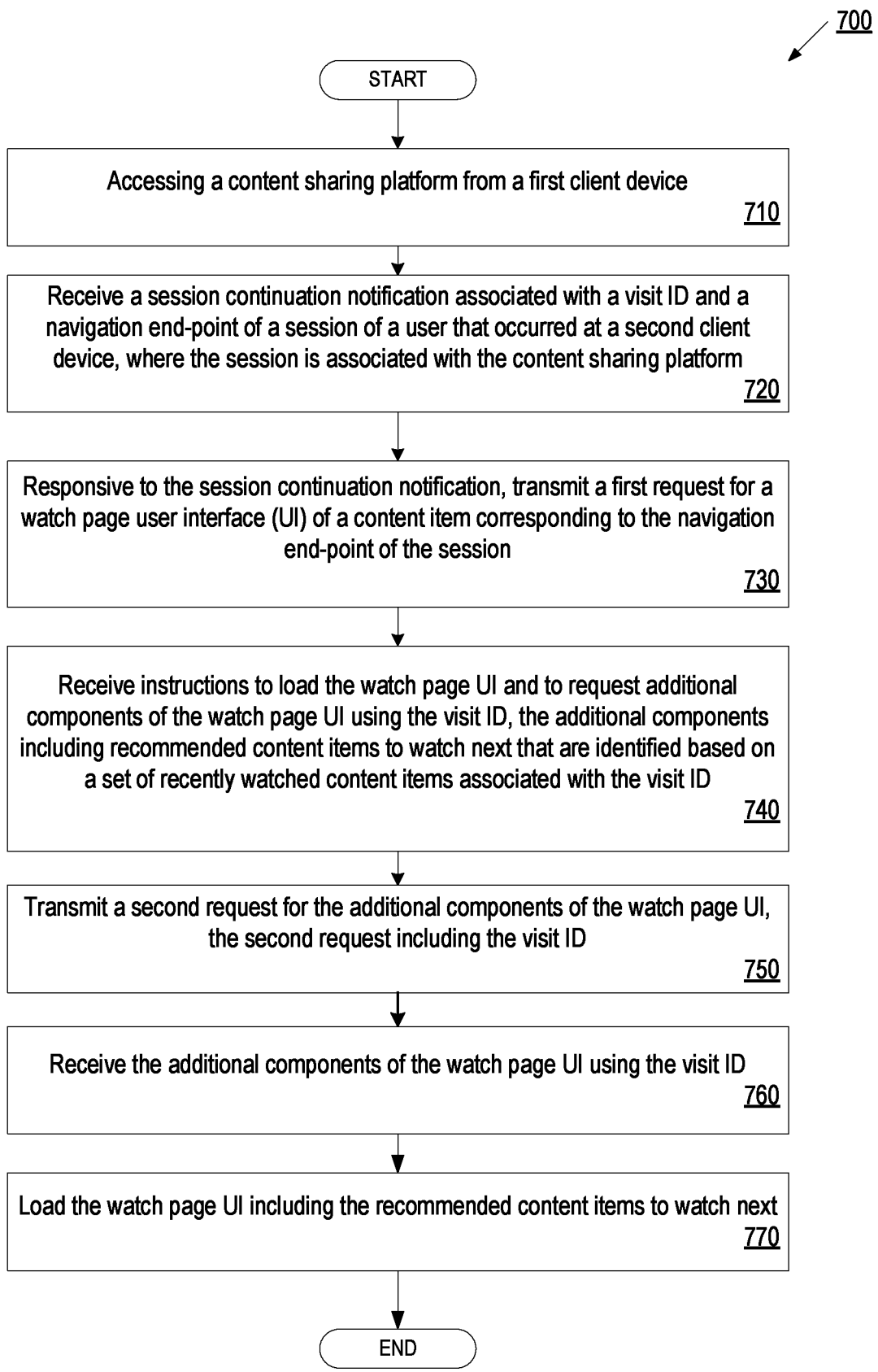
FIG. 7 is a flow diagram illustrating a method for implementing a handoff feature for a content sharing platform at a client device, according to an implementation.

FIG. 7 is a flow diagram illustrating a method 700 for implementing a handoff feature for a content sharing platform at a client device, according to some implementations of the disclosure. The method 700 may be performed by processing logic that comprises hardware (e.g., circuitry, dedicated logic, programmable logic, microcode, etc.), software (e.g., instructions run on a processing device to perform hardware simulation), or a combination thereof. In one implementation, method 700 may be performed by client handoff component 115 as shown in FIGS. 1 and 2.

Method 700 begins at block 710 where a content sharing platform is accessed from a first client device. The content sharing platform may be accessed, for example, via a content sharing platform application on the first client device or via a web browser of the first client device. At block 720, a session continuation notification is received, where the session continuation notification includes a visit ID and a navigation endpoint of a session of the user that occurred at the second client device. The session of the user is associated with the content sharing platform.

Subsequently, at block 730, responsive to the session continuation notification, a first request for a watch page UI of a content item corresponding to the navigation end-point is transmitted. The request may be transmitted from the first client device to a server device of the content sharing platform. At block 740, instructions to load the watch page UI and to request additional component of the watch page UI using the visit ID are received. The additional components may include recommended content items to watch next (e.g., a playlist) that are identified based on a set of recently-watched content items associated with the visit ID.

Then, at block 750, a second request for the additional component of the watch page UI is transmitted, where the request includes the visit ID. At block 760, the additional components of the watch page UI are received response to the second request. Lastly, at block 750, the watch page UI is loaded, where the watch page UI includes the recommended content items to watch next. The recommended content items are identified using the visit ID.

Figure 8:
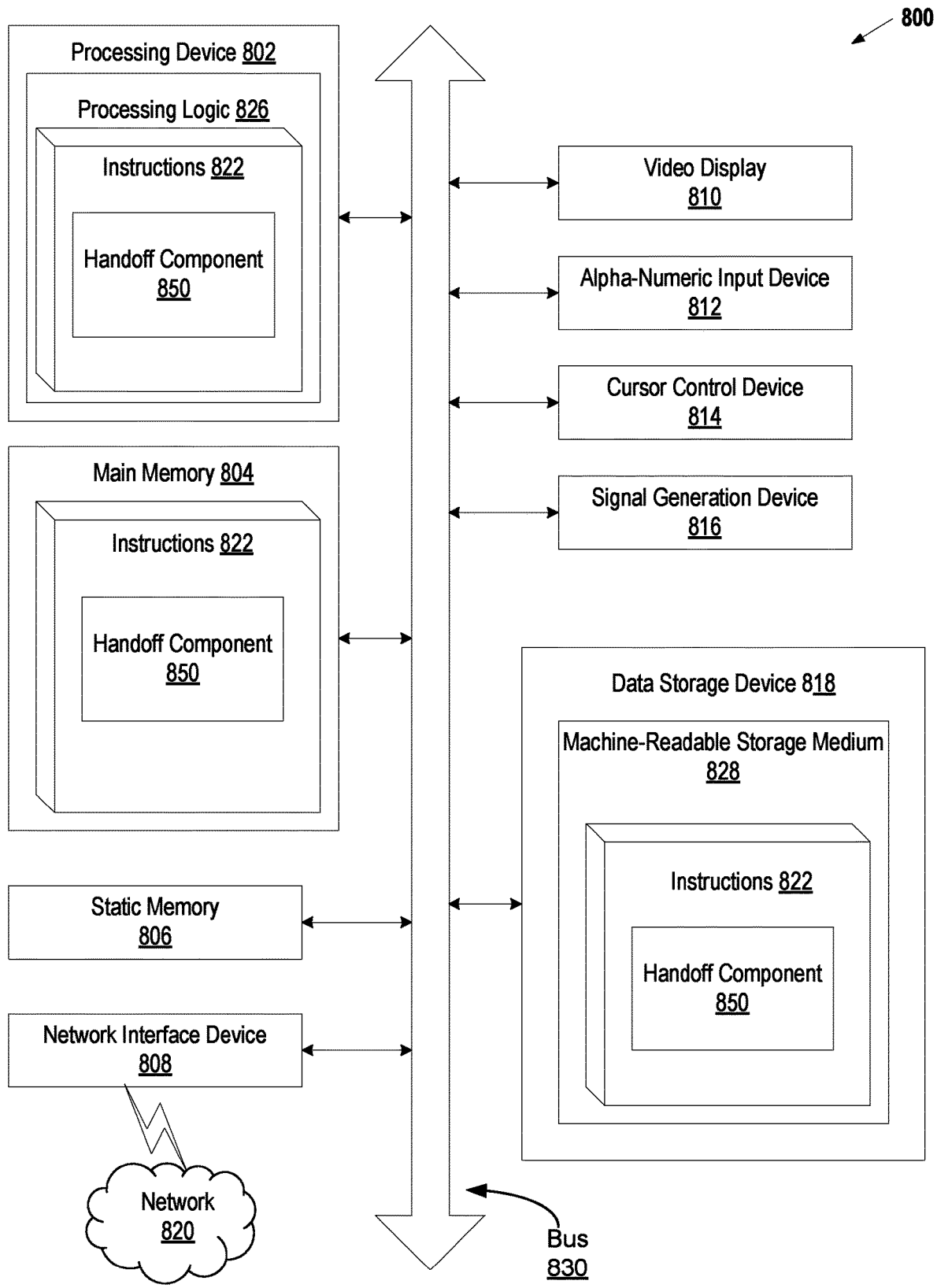
FIG. 8 is a block diagram illustrating one implementation of a computer system, according to an implementation.

FIG. 8 illustrates a diagrammatic representation of a machine in the exemplary form of a computer system 800 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 800 may be representative of a server (such as server 102) or client (such as client 110A-110Z) executing a handoff component 850, such as server handoff component 140 or client handoff component 115, as described with respect to FIGS. 1 and 2.

The exemplary computer system 800 includes a processing device 802, a main memory 804 (e.g., read-only memory (ROM), flash memory, dynamic random access memory (DRAM) (such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 802 is configured to execute processing logic 826 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a computer-readable storage medium 828 (also referred to as a machine-readable storage medium), on which is stored one or more set of instructions 822 (e.g., software) embodying any one or more of the methodologies of functions described herein. The instructions 822 may also reside, completely or at least partially, within the main memory 804 and/or within the processing device 802 during execution thereof by the computer system 800; the main memory 804 and the processing device 802 also constituting machine-readable storage media. The instructions 822 may further be transmitted or received over a network 820 via the network interface device 808.

The computer-readable storage medium 828 may also be used to store instructions to perform a method for providing a handoff feature for a content sharing platform, as described herein. While the computer-readable storage medium 828 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

What is claimed is:

1. A method comprising:
   maintaining a session history of a session that occurred at a first client device, the session history comprising a set of recently consumed content items on a content sharing platform, wherein maintaining the session history comprises, for each event of the session:
  logging a session identifier (ID), wherein the session ID is associated with content sharing platform events that relate to a user associated with the session that occurred on the first client device and that are logged in event log data; and
  logging a visit ID that is different than the session ID, the visit ID associated with content sharing platform events associated with the first client device and corresponding to the user, wherein the visit ID is logged in the event log data;
determining that the user associated with the session is active on a second client device;
transmitting, by a processing device to the second client device, a session continuation notification comprising a payload, the payload comprising the visit ID and a navigation end-point of the session at the first client device;
receiving, from the second client device responsive to the session continuation notification, a request for a content item corresponding to the navigation end-point of the session; and
transmitting, by the processing device to the second client device, instructions to:
  load the content item corresponding to the navigation end-point of the session at the first client device; and
  request additional components of the content item using the visit ID, wherein the visit ID is obtained from the event log data, the additional components comprising recommended content items to consume next that are identified based on the set of recently consumed content items associated with the visit ID, wherein the recommended content items comprise a playlist.

2. The method of claim 1, wherein the navigation end-point comprises an identifier of a last consumed content item on the first client device and a timestamp comprising a location within the last viewed content item corresponding to a stopping point of the session at the first client device.

3. The method of claim 1, wherein occurrences of the content sharing platform events associated with the visit ID are separated by less than a determined time interval, wherein the visit ID is logged in the event log data.

4. The method of claim 1, further comprising:
  receiving an indication of a user selection of a handoff feature from the first client device during the session occurring at the first client device; and
  responsive to receiving the indication:
    identifying one or more client devices comprising at least the second client device as associated with the user;
    generating the session continuation notification responsive to receiving the indication; and
    transmitting the session continuation notification to the identified one or more client devices.

5. The method of claim 1, wherein the one or more client devices are registered and identified as associated with the user at the content sharing platform.

6. The method of claim 1, further comprising:
  determining that the content sharing platform is being accessed at the second client device, where the access is associated with the user;
  responsive to the determining, identifying the session of the user on the first client device;
  identifying the visit ID and the navigation end-point as corresponding to the session; and
  generating the session continuation notification.

7. The method of claim 1, wherein the second client device loads the content item and the additional components on the second client device in response to receiving the instructions, and wherein the content item and the additional components allow the session to resume on the second client device.

8. A client device comprising:
a memory; and
a processing device coupled to the memory, wherein the processing device is to:
  access a content sharing platform via an application executed by the processing device, the access on behalf of a user of the client device and associated with a session history comprising a set of recently consumed content items on a content sharing platform, wherein each event of the session history is associated with:
    a session identifier (ID), wherein the session ID is associated with content sharing platform events that relate to the user that occurred on the first client device and that are logged in event log data; and
    wherein the session ID is associated with content sharing platform a visit ID that is different than the session ID, the visit ID associated with content sharing platform events associated with the first client device and corresponding to the user, wherein the visit ID is logged in the event log data;
  receive a session continuation notification comprising a payload, the payload comprising the visit ID and a navigation end-point of a session of the user that occurred on another client device, the session associated with the content sharing platform;
  transmit a first request for a content item corresponding to the navigation end-point of the session;
  receive, responsive to the first request, instructions to load the navigation end-point of the session and to request additional components of the content item by using the visit ID, wherein the visit ID is obtained from the event log data, the additional component comprising recommended content items to consume next that are identified based on a set of recently consumed content items associated with the visit ID;
  transmit a second request for the additional components of the content item, the second request comprising the visit ID; and
  responsive to receiving the additional components, provide the recommended content items to consume next, wherein the recommended content items comprise a playlist.

9. The client device of claim 8, wherein the application is at least one of a content sharing platform application or a browser application.

10. The client device of claim 8, wherein the navigation end-point comprises an identifier of a last consumed content item on the another client device and a timestamp comprising a location within the last viewed content item corresponding to a stopping point of the session at the another client device.

11. The client device of claim 8, wherein occurrences of the content sharing platform events associated with the visit ID are separated by less than a determined time interval, wherein the visit ID is logged in the event log data.

12. The client device of claim 8, wherein the content item and the additional components allow the session to resume on the client device.

13. The client device of claim 8, wherein the session continuation notification is generated responsive to user selection of a handoff feature at the another client device during the session occurring at the another client device.

14. The client device of claim 8, wherein the session continuation notification is generated responsive to automatic detection of the access of the content sharing platform at the application of the client device.

15. A non-transitory machine-readable storage medium storing instructions which, when executed, cause a processing device to perform operations comprising:
    maintaining a session history of a session that occurred at a first client device, the session history comprising a set of recently consumed content items on a content sharing platform, wherein maintaining the session history comprises, for each event of the session:
        logging a session identifier (ID), wherein the session ID is associated with content sharing platform events that relate to a user associated with the session that occurred on the first client device and that are logged in event log data; and
        logging a visit ID that is different than the session ID, the visit ID associated with content sharing platform events associated with the first client device and corresponding to the user, wherein the visit ID is logged in the event log data;
    determining that the user associated with the session is active on a second client device;
    transmitting, by the processing device to the second client device, a session continuation notification comprising a payload, the payload comprising the visit ID and a navigation end-point of the session at the first client device;
    receiving, from the second client device responsive to the session continuation notification, a request for a content item corresponding to the navigation end-point of the session; and
    transmitting, by the processing device to the second client device, instructions to:
        load the content item corresponding to the navigation end-point of the session at the first client device; and
        request additional components of the content item using the visit ID, wherein the visit ID is obtained from the event log data, the additional components comprising recommended content items to consume next that are identified based on the set of recently consumed content items associated with the visit ID, wherein the recommended content items comprise a playlist.

16. The non-transitory machine-readable storage medium of claim 15, wherein the navigation end-point comprises an identifier of a last consumed content item on the first client device and a timestamp comprising a location within the last viewed content item corresponding to a stopping point of the user viewing session at the first client device.

17. The non-transitory machine-readable storage medium of claim 15, wherein occurrences of the content sharing platform events associated with the visit ID are separated by less than a determined time interval, wherein the visit ID is logged in the event log data.

18. The non-transitory machine-readable storage medium of claim 15, wherein the operations further comprise:
    receiving an indication of a user selection of a handoff feature from the first client device during the session occurring at the first client device; and
    responsive to receiving the indication:
        identifying one or more client devices comprising at least the second client device as associated with the user;
        generating the session continuation notification responsive to receiving the indication; and
        transmitting the session continuation notification to the identified one or more client devices.

19. The non-transitory machine-readable storage medium of claim 15, wherein the operations further comprise:
    determining that the content sharing platform is being accessed at the second client device, where the access is associated with the user;
    responsive to the determining, identifying the session of the user on the first client device;
    identifying the visit ID and the navigation end-point as corresponding to the session; and
    generating the session continuation notification.

20. The non-transitory machine-readable storage medium of claim 15, wherein the second client device loads the content item with the additional components on the second client device in response to receiving the instructions, and wherein the content item with the additional components allow the session to resume on the second client device.

* * * * *